(12) United States Patent
Varekamp

(10) Patent No.: US 8,498,482 B2
(45) Date of Patent: Jul. 30, 2013

(54) IMAGE SEGMENTATION

(75) Inventor: Christiaan Varekamp, Eimdhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 257 days.

(21) Appl. No.: 13/133,467

(22) PCT Filed: Dec. 3, 2009

(86) PCT No.: PCT/IB2009/055486
§ 371 (c)(1),
(2), (4) Date: Jun. 8, 2011

(87) PCT Pub. No.: WO2010/067277
PCT Pub. Date: Jun. 17, 2010

(65) Prior Publication Data
US 2011/0243443 A1 Oct. 6, 2011

(30) Foreign Application Priority Data
Dec. 9, 2008 (EP) .................................. 08171031

(51) Int. Cl.
*G06K 9/34* (2006.01)
(52) U.S. Cl.
USPC ........................................................ 382/173
(58) Field of Classification Search
USPC ................. 382/162–165, 170–171, 173–180, 382/224–228; 358/2.1, 1.9, 464; 715/723
See application file for complete search history.

(56) References Cited

U.S. PATENT DOCUMENTS

| 6,819,795 | B1 * | 11/2004 | Chiu et al. | 382/173 |
| 6,973,212 | B2 * | 12/2005 | Boykov et al. | 382/173 |
| 7,400,767 | B2 * | 7/2008 | Slabaugh et al. | 382/173 |
| 7,822,274 | B2 * | 10/2010 | Sinop et al. | 382/173 |
| 8,107,726 | B2 * | 1/2012 | Xu et al. | 382/173 |
| 8,121,367 | B2 * | 2/2012 | Socher et al. | 382/128 |
| 8,200,014 | B2 * | 6/2012 | Wilensky et al. | 382/173 |
| 2002/0085754 | A1 | 7/2002 | Schoepflin | |

FOREIGN PATENT DOCUMENTS

WO    WO2008052226 A2    5/2008

OTHER PUBLICATIONS

Rother C et al: "GrabCut—interactive foreground extraction using iterated graph cuts", ACM Transactions on Graphics, ACM, US, vol. 23, No. 3, Aug. 1, 2004, pp. 309-314, XP002340109.
Xue Bai et al: "A Geodesic Framework for Fast Interactive Image and Video Segmentation and Matting" Computer Vision, 2007. ICCV 2007. IEEE IIth International Conference 0 N, IEEE, PI, Oct. 1, 2007, pp. 1-8, XP031194420.

(Continued)

*Primary Examiner* — Ishrat I Sherali
(74) *Attorney, Agent, or Firm* — Larry Liberchuk

(57) ABSTRACT

A device for segmenting an image comprises a user input (301, 305, 307) for receiving segment indications and boundary indications for the image. Each segment indication identifies a set of pixel regions and a relationship between the set of pixel regions and an associated segment class of a plurality of segment classes. Each boundary indication identifies a boundary between pixels belonging to different segment classes. A segmentation processor (309) then segments the image into the plurality of segment classes in response to both the number of segment indications and the number of boundary indications. Specifically, a propagation of values linking the pixel regions to segment classes are propagated based on the segment indications with the propagation being constrained (e.g. attenuated or blocked) by the boundary indications. The invention may improve or facilitate interactive image segmentation e.g. for frames of a video signal.

15 Claims, 6 Drawing Sheets

OTHER PUBLICATIONS

Xue Bai et al: "Distancecut: Interactive Segmentation and Matting of Images and Videos", Image Processing, 2007. ICIP 2007. IEEE International Conference on, IEEE, PI, Sep. 1, 2007, pp. 11-249, XP031157908.

Alexis Protiere et al: "Interactive Image Segmentation via Adaptive Weighted Distances" IEEE Transactions on Image Processing, IEEE Service Center, Piscataway, NJ, US, vol. 16, No. 4, Apr. 1, 2007, pp. 1046-1057, XP011174993.

McInerney et al: "SketchSnakes: Sketch-line initialized Snakes for efficient interactive medical image segmentation", Computerized Medical Imaging and Graphics, Pergamon Press, New York, NY, US, vol. 32, No. 5, Jul. 1, 2008, pp. 331-352, XP022686428.

Boykov Y Y et al: "Interactive graph cuts for optimal boundary & region segmentation of objects in N-D images" Proceedings of the Eight IEEE International Conference on Computer Vision. (ICCV). Vancouver, British Columbia, Canada, Jul. 7-14, 2001; [International Conference on Computer Vision], Los Alamitos, CA : IEEE Comp. Soc, vol. 1, Jul. 7, 2001, pp. 105-112, XP010553969.

Anat Levin et al., "Colorization using Optimization", School of Computer Science and Engineering, The Hebrew University of Jerusalem.

Christoph Rhemann et al., "High Resolution Matting via Interactive Trimap Segmentation", Technical report corresponding to the CVPR'08 paper, TR-188-2-2008-04.

\* cited by examiner

IMAGE SEGMENTATION

FIELD OF THE INVENTION

The invention relates to segmentation of an image and in particular, but not exclusively, to segmentation of images of a video signal.

BACKGROUND OF THE INVENTION

Segmentation of images is an important process for many digital image processing techniques. For example, image segmentation may be used for generating depth maps for three dimensional imaging, for object identification, for artificial coloration etc. Efficient interactive image segmentation by an operator is important in e.g. digital photo and image processing or in post-production work for video or digital images. For example the creation of a depth map or disparity map for stereoscopic video requires the specification of object borders in order to assign depth or disparity accurately.

Examples of methods for performing interactive segmentation of images may be found in the paper "GrabCut—Interactive Foreground Extraction using Iterated Graph Cuts" by Carsten Rother, Vladimir Kolmogorov, Andrew Blake, August 2004, SIGGRAPH (Special Interest Group on GRAPHics and Interactive Techniques) 2004 (available at http://research.microsoft.com/vision/Cambridge/papers/siggraph04.pdf).

Currently methods exist for efficient segmentation based on placing so called 'scribbles' to roughly identify where an object of interest is located. A scribble is typically a curve manually drawn on an image by a user to specify pixels that are known to belong to a specific object, i.e. which are indicated by the user to belong to the same segment. For example, a scribble may be drawn inside an image object to specify that the underlying pixels are part of the image object. A segmented region may then spread out from the scribble with neighboring pixels being assigned to the same segment until an edge of the object is estimated to be reached (e.g. due to a detection of a colour transition). Alternatively or additionally, a scribble may be drawn which identifies a number of pixels that are indicated by the user to not belong to the specific object and thus which should not be included in the image object segment (typically equivalent to the scribble defining a number of pixels that should be included in a complementary segment to the image object segment). In this case, the same approach may be used to assign pixels to a different segment than the segment corresponding to the image object until a transition is detected. For example, an outside object scribble may be used to define background pixels and an inside object scribble may be used to define foreground pixels for a foreground object. An example of an image with such scribbles is illustrated in FIG. 1.

However, although such approaches may assist in the segmentation of an image, it may provide suboptimal performance for many images. For example, if a colour transition is very small or absent between neighboring objects, the algorithm will often not lead to an optimal and sharp separation between the different segments. Although, this degradation in the segmentation accuracy may be alleviated by placing further and more accurate and detailed scribbles, this substantially increases the required user interaction and results in a cumbersome and laborious process.

Another approach that has been proposed for interactive segmentation is for users to directly define the edges between different objects. For example, a user may trace the specific contour of an image object and the segmentation may use this as a definition of a border between different segments by assigning the pixels on one side of the contour to one segment and the pixels on the other side to another segment. However, this approach tends to be very demanding and time consuming for a user and requires the user to manually trace many (or even all) contours to provide the segmentation. Thus, the segmentation approach is very laborious and cumbersome. Furthermore, the resulting segmentation may often be suboptimal as the user entered contours may not exactly match the underlying object edges. Also, it may be difficult to identify exactly which segments the individual pixels belong in case there is more than one segment represented on one side of a contour. An example of an image with user defined contours is illustrated in FIG. 2.

Hence, an improved approach to image segmentation would be advantageous and in particular a system allowing increased flexibility, reduced complexity, reduced user interaction, improved segmentation and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a method of segmenting an image, the method comprising: receiving a number of segment indications for the image, each segment indication identifying a set of pixel regions and a relationship between the set of pixel regions and an associated segment class of a plurality of segment classes; receiving a number of boundary indications for the image, each boundary indication identifying a boundary between pixels belonging to different segment classes of the plurality of segment classes; and segmenting the image into the plurality of segment classes in response to both the number of segment indications and the number of boundary indications.

The invention may provide improved segmentation. In particular, improved interactive image segmentation based on user provided segment indications and boundary indications can be achieved. The invention may in particular allow improved segmentation around object edges not exhibiting strong visual transitions while still allowing semi-automated segmentation. The required user interaction for a given image and segmentation accuracy may be reduced in many embodiments.

The segmenting may be a combined segmentation simultaneously considering both segment and image indications when assigning a pixel region to a segment class. The segmenting may be by an allocation of pixel regions to segment classes based on a propagation of segment class allocations from segment indications with the propagation being constrained by the boundary indications.

The segment indications and/or boundary indications may be user defined and may be received from a user input. The segment indication may specifically be a user entered scribble and the boundary indication may be a user entered contour. Each pixel region may comprise a single pixel or some or all pixel regions may comprise a plurality of pixels. A segment class may have none, one or more segments assigned to it. In some embodiments, a segment class may only have one segment assigned to it and thus a segment and a segment class may be equivalent.

In accordance with an optional feature of the invention, the segmenting comprises: assigning a segment class link value to each pixel region identified by at least a first segment indication, the segment class link value being indicative of a linking of the pixel region and the associated segment class of the first segment indication; propagating segment class link values to unassigned pixel regions in the image; and attenuating the propagation of segment class link values at a boundary indication.

This may provide improved segmentation and/or facilitate operation and/or reduce complexity. In particular, the segments indicated by segment indications may automatically be expanded to cover suitable image areas while making this expansion constrained by boundary indications thereby providing improved image segment edge determination. The approach may allow selective segment boundary information to be provided to direct the segment indication based propagation thereby ensuring improved segmentation in critical hard to segment areas.

The approach may provide a particularly advantageous combination of the use of information provided by the segment indications and the boundary indications. In particular, it may provide an efficient integration of the indications in a single algorithm with low complexity and resource requirements. The approach may furthermore provide a suitable balance of the information from segment indications and boundary indications when performing the segmentation.

The attenuation of the propagation of segment class link values at boundary indications may specifically block propagation of the segment class link values across a boundary indication.

In accordance with an optional feature of the invention, the propagation of the segment class values is further dependent on a similarity of visual properties for the pixel regions.

This may provide improved segmentation and/or facilitate operation and/or reduce complexity. In particular, it may combine well with the use of segment and boundary indications.

In accordance with an optional feature of the invention, the segmenting comprises: assigning a first segment class link value for a first segment class of the plurality of segment classes to pixel regions identified by at least one segment indication associated with the first segment class, each segment class link value providing a link strength indication between the pixel region and the first segment class; determining segment class link values for the first segment class for a group of pixel regions; and for at least some pixel regions of the group of pixel regions selecting a segment class of the plurality of segment classes in response to the segment class link value for the first segment class for the pixel region; wherein determining the segment class link values comprises: determining segment class link values for each pixel region of the group of pixel regions as a combination of segment class link values of a neighborhood set of pixel regions, the combination being dependent on any of the neighborhood set of pixel regions being separated from the each pixel region by a boundary indication.

This may provide improved segmentation and/or facilitate operation and/or reduce complexity. In particular, the segments indicated by segment indications may automatically be expanded to cover suitable image areas while making this expansion constrained by boundary indications thereby providing improved image segment edge determination. The approach may allow selective segment boundary information to be provided to direct the segment indication based propagation thereby ensuring improved segmentation in critical hard to segment areas.

The approach may provide a particularly advantageous combination of the use of information provided by the segment indications and the boundary indications. In particular, it may provide an efficient integration of the indications in a single algorithm with low complexity and resource requirements. The approach may furthermore provide a suitable balance of the information from segment indications and boundary indications when performing the segmentation.

The propagation using neighboring sets of pixel regions may provide low complexity, low resource usage while maintaining a high quality segmentation.

A segment class link value for a pixel region and a segment class may indicate a likelihood that the pixel region belongs to the segment class. The group of pixel regions may include all pixel regions in the image or may be a subset thereof.

The group of pixel regions may specifically exclude pixel regions that are assigned a segment class link value based on a segment indication. The group of pixel regions may specifically correspond to an unassigned set of pixel regions, the unassigned set of pixel regions corresponding to pixel regions that have not been assigned a segment class link value in response to a segment indication. The neighborhood set of pixel regions may specifically be a set of pixel regions which meet a distance, direction and/or position criterion relative to the pixel region for which the combination is performed.

In accordance with an optional feature of the invention, the assigning comprises further assigning an initial segment class link value to at least some pixel regions not assigned the first segment class link value, the initial segment class link value being indicative of a weaker link to the first segment class than the first segment class link value.

This may improve and/or facilitate segmentation. The method may for example initially assign a maximum link value to segment class link values that are associated with pixel regions identified by segment indications for the segment class and a minimum link value to class link values that are associated with pixel regions that are not identified by the segment indications. For example, a segment class link value corresponding to a probability of one that the pixel region belongs to the first segment class may be assigned to pixel regions that are identified by the first segment indication with a probability of zero being assigned to all other pixel regions.

In accordance with an optional feature of the invention, the combination is such that a weighting of a segment class link value for a separated pixel region of the neighborhood set of pixel regions is reduced, the separated pixel region being a pixel region separated from the each pixel region by a boundary indication.

This may improve and/or facilitate segmentation.

In accordance with an optional feature of the invention, the weighting of the separated pixel region is zero.

This may improve and/or facilitate segmentation. In particular, it may block the propagation thereby reflecting a hard segmentation edge.

In accordance with an optional feature of the invention, the combination is such that a weighting of a segment class link value for a neighborhood pixel region of the neighborhood set of pixel regions is dependent on a similarity measure for a visual characteristic of the neighborhood pixel region and a visual characteristic of the each pixel region.

This may provide improved segmentation and/or facilitate operation and/or reduce complexity. In particular, it may combine well with the use of segment and boundary indications.

In accordance with an optional feature of the invention, the step of determining segment class link values for each pixel region of the set of pixel regions is iterated prior to the step of for each pixel region of the group of pixel regions selecting the segment class.

This may provide improved segmentation and/or facilitate operation and/or reduce complexity.

In accordance with an optional feature of the invention, the method further comprises the steps of: assigning a second segment class link value for a second segment class of the plurality of segment classes to pixel regions identified by at least one segment indication associated with the second segment class, each segment class link value providing a link strength indication between the pixel region and the second segment class; determining segment class link values for a group of pixel regions for the second segment class; and the step of for each pixel region of the group of pixel regions selecting the segment class comprises selecting the segment class for a first pixel region in response to a comparison of a segment class link value for the first pixel region for the first segment class and a segment class link value for the first pixel region for the second segment class.

This may provide improved segmentation and/or facilitate operation and/or reduce complexity. In particular, it may allow an improved selection of which segment class an individual pixel region belongs to. The approach may e.g. be extended to all segment classes. The selection of the segment class for a pixel region may specifically correspond to a selection of the segment class having the segment class link value indicative of the strongest link of the pixel region to the segment class.

In accordance with an optional feature of the invention, the method further comprises: presenting a segmentation of the image to a user; receiving a user input of at least one of a new segment indication and a new boundary indication for the image; and updating the segmentation in response to at least one of the new segment indication and the new boundary indication.

The invention may provide an improved iterative user interactive segmentation process. The method may in particular present segmentation results to a user that allows the user to identify critical areas for the segmentation. The segmentation of such areas may then be improved by the user providing additional boundary information resulting in an updated and improved segmentation. For example, a semi-automated propagation based segmentation may iteratively be refined by an additional user input.

In accordance with an optional feature of the invention, the method further comprises generating pixel regions by an initial segmentation not being based on any boundary indications or segment indications.

This may provide improved segmentation and/or facilitate operation and/or reduce complexity. In particular, it may allow reduced computational resource as an individual pixel based processing is not necessary. The initial segmentation may typically generate segments that are substantially smaller than the expected segment sizes.

In accordance with an optional feature of the invention, the segmentation is a depth map segmentation.

The invention may provide an improved depth map segmentation suitable e.g. for generation of three dimensional image data. The depth map may comprise depth indications, disparity indications or any other property indicative of an absolute or relative depth for image objects or areas.

In accordance with an optional feature of the invention, there is provided computer program product for executing the above described method.

According to an aspect of the invention there is provided a device for segmenting an image, the apparatus comprising: means for receiving a number of segment indications for the image, each segment indication identifying a set of pixel regions and a relationship between the set of pixel regions and an associated segment class of a plurality of segment classes; means for receiving a number of boundary indications for the image, each boundary indication identifying a boundary between pixels belonging to different segment classes of the plurality of segment classes; and means for segmenting the image into the plurality of segment classes in response to both the number of segment indications and the number of boundary indications.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to segmentation of an image in order to generate a depth map indicative of different depth levels (and specifically of a foreground and background depth) for different image objects or areas. However, it will be appreciated that the invention is not limited to this application but may be applied to many other types of, and purposes for, image segmentation.

Figure 1:
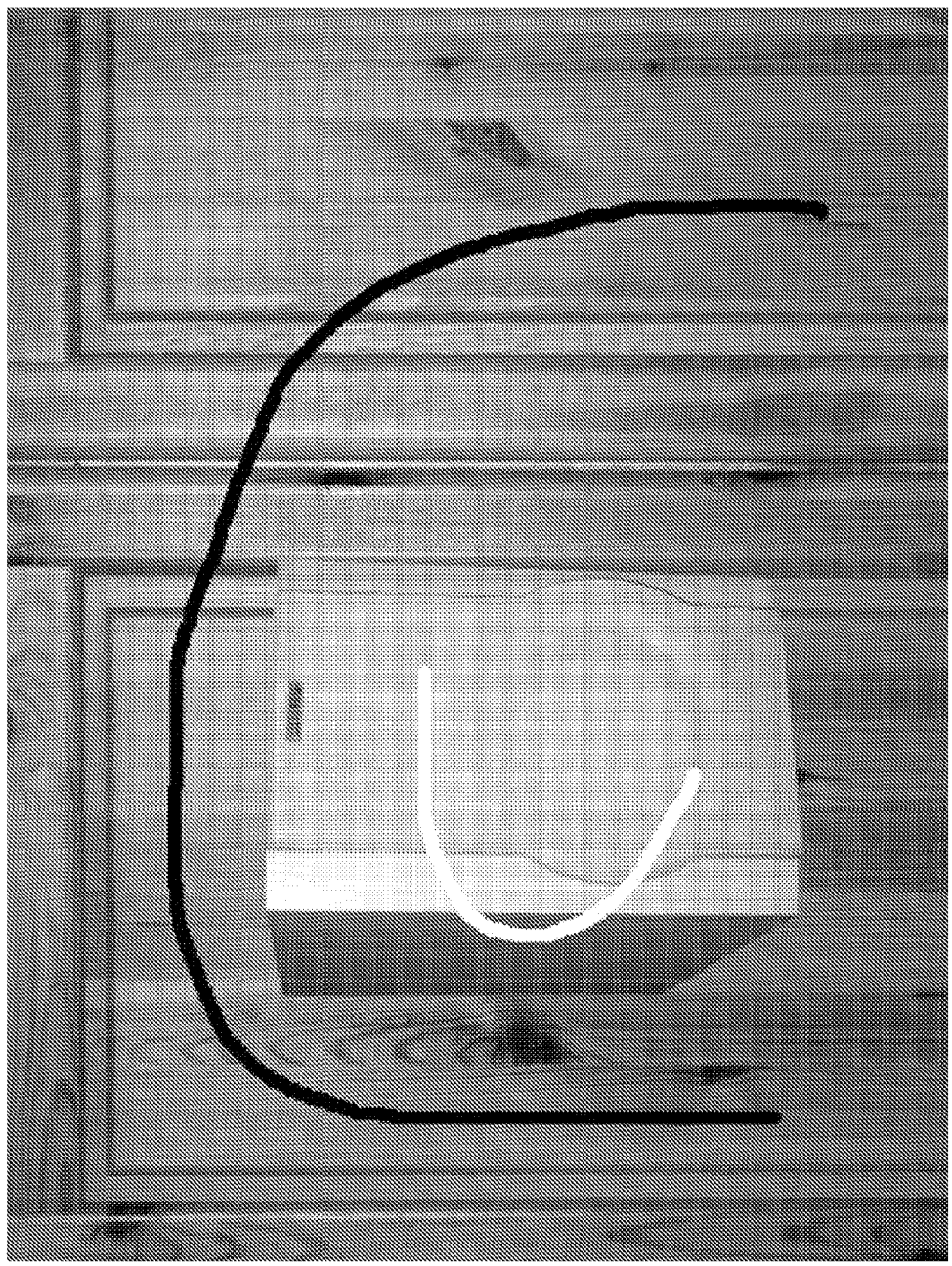
FIG. 1 illustrates an example of an image with an outside object scribble and an inside object scribble.
Figure 2:
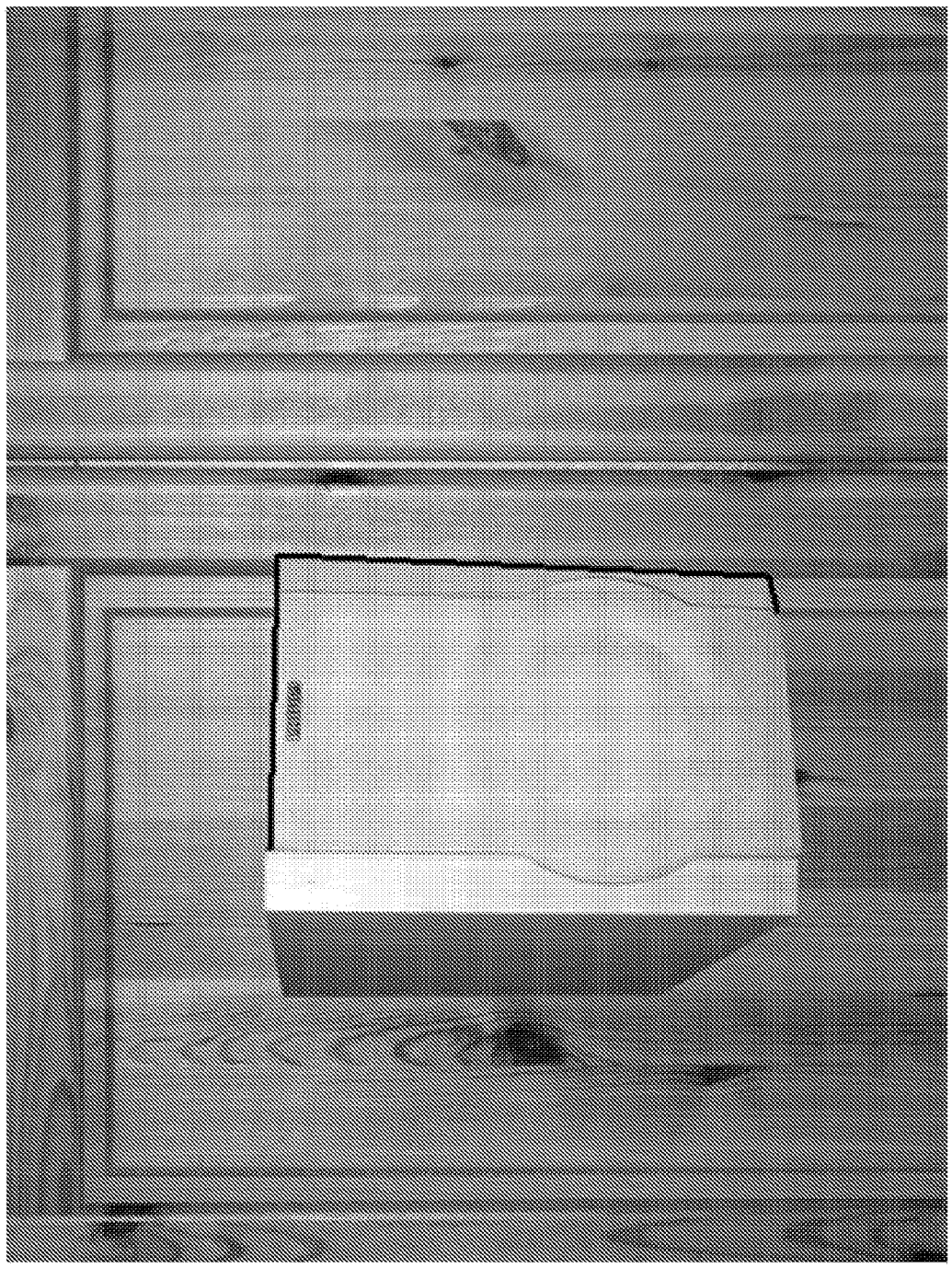
FIG. 2 illustrates an example of an image with user defined contours.
Figure 3:
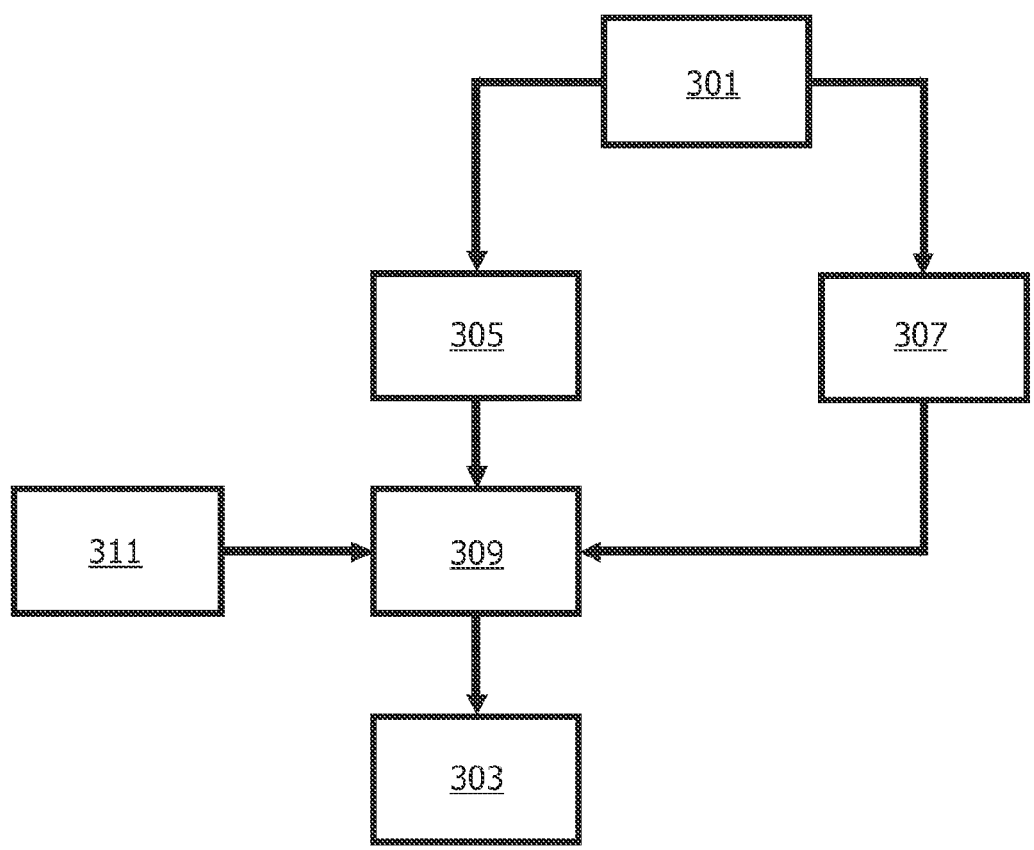
FIG. 3 illustrates an example of an apparatus for segmenting an image in accordance with some embodiments of the invention.

FIG. 3 illustrates an example of an apparatus for segmenting an image in accordance with some embodiments of the invention.

The apparatus comprises a user input 301 which can receive inputs from a user and a display 303 which can display the image being segmented. In the specific example, the display is a touch sensitive display with the user input 301 corresponding to the touch sensitive part of the display arrangement. It will be appreciated that in other embodiments, other types of user input may be used including for example a mouse, a touch pad or a graphic tablet. The user input is coupled to a segment processor 305 and a boundary processor 307 which are both coupled to a segmentation processor 309 that is further coupled to the display 303.

The segmentation processor 309 is further coupled to an image source 311 which provides an image to be segmented to the segmentation processor 309. In the specific example the image is an image of a video sequence and specifically may be a frame of a video signal. However, it will be appreciated that in other examples, a single image, such as a digital photo, may be segmented.

The segmentation processor 309 may present the image being segmented on the display 303 and the user may provide user inputs to assist the segmentation. Specifically, the user may input data indicating specific pixels that are considered to fall within (or alternatively outside) the same segment, as well as information indicating borders or edges between different segments.

The operator may enter a segment indication which indicates a set of pixels that should belong to a specific segment class. Specifically, the segmentation of the image will divide the image into different segments with each segment belonging to specific segment class and a set of pixels that all belong to the same segment class may be identified by a segment indication.

The following description will focus on an example wherein the segmentation of the image is into a number of segments where each segment can belong to one of two segment classes. In the example, binary depth segmentation is performed with one segment classes corresponding to a background and another segment class corresponding to a foreground of the image. Thus, the segmentation of the image is simply into foreground image objects and background image areas. However, it will be appreciated that in other embodiments, the segmentation may be into more than two segment classes and that the segmentation may be a segmentation intended for other purposes and considering other characteristics. For example, the approach may be used to identify separate image objects (e.g. for motion estimation) with a separate segment class being associated with each image object.

The segment indication provided by the user indicates a set of pixels that are considered to belong to the same segment class. For example, the user may indicate a set of foreground pixels that must be included in a foreground segment. Similarly, the user may indicate a set of background pixels that must be included in a background segment.

As a specific example, the user may first select a segment class, such as e.g. the foreground segment class. Subsequently, the user may manually indicate some pixels that should belong to that segment class, i.e. may indicate some foreground pixels. This indication is in the system of FIG. 3 provided by the user directly applying a stylus to the touch sensitive display and drawing e.g. a line or curve indicating foreground pixels.

The user may enter a plurality of segment indications including several segment indications for the same segment (or segment class) or for different segment classes.

In some embodiments, the segment indications may alternatively or additionally define a set of pixels that should not belong to a given segment class. For example, the user may select the foreground segment class and then select an option reflecting that the selected pixels are not being part of the selected segment class. Thus, the user may alternatively or additionally input a segment indication that identifies that pixels are not foreground pixels. Such an indication may correspond to an identification of pixels that belong to another segment class (e.g. for a segmentation into only foreground and background, a negative foreground indication corresponds to a positive background indication) but does not necessarily do so. For example, for segmentation into background, middle ground and foreground segment classes, a segmentation indication may indicate pixels that are not foreground pixels but without specifying whether they are background or middle ground pixels.

When the user enters a segment indication, the user input is fed to the segment processor 305 which proceeds to generate data defining the selected set of pixels positions for the selected segment class. This data is then forwarded to the segmentation processor 309 to be used when segmenting the image.

The operator of the system can also enter a boundary indication which indicates a boundary between pixels belonging to different segment class. Thus, the user may define an edge between image objects that belong to different segments which belong to different segment classes. Specifically, the operator may define a boundary between a foreground image object and a background image area.

As a specific example, the user may first select the option of entering a boundary indication. Subsequently, the user may manually indicate some positions that separate two segments (and segment classes). This indication is in the system of FIG. 3 provided by the user directly applying a stylus to the touch sensitive display and drawing e.g. a line or curve indicating the border between the two segments.

The user may enter a plurality of boundary indications. Furthermore, a boundary indication may have zero width (i.e. it may be determined to lie between pixels) or may have a width of one or more pixels (thus resulting in some pixels being boundary pixels). The following description will focus on boundary indications lying between pixels (i.e. on examples where there are no boundary pixels).

In the device of FIG. 3, when the user enters a boundary indication, the user input is fed to the boundary processor 307 which proceeds to generate data defining the selected set of inter-pixel positions for the boundary. This data is then forwarded to the segmentation processor 309 to be used when segmenting the image.

It will be appreciated that the user may provide a segment indication by specifically drawing a line or curve on the image identifying a set of positions that belong to a specific segment class. This is often referred to as a "scribble". However, it will also be appreciated that other user inputs may be used including for example using a brush tool, indicating separate areas that belong to a segment class (e.g. corresponding to "stamping" various areas that should be included in a segment or segment class).

Similarly, it will be appreciated that the user may provide a boundary indication by specifically drawing a line or curve on the image identifying a set of positions that separate two segments belonging to a different segment classes. This is often referred to as a "contour". However, it will also be appreciated that other user inputs may be used.

As a specific example, the system of FIG. 3 may operate in two user input modes:

Scribble mode: In this mode, the user can place a scribble in the interior of an arbitrary object. The scribble is linked to a specific segment class. Scribbles should not cross object boundaries.

Contour mode: In this mode, the user can place a contour on a transition between two objects. Specifically, a number of points on the transition may be selected and they may be combined to form a curve.

Figure 4:
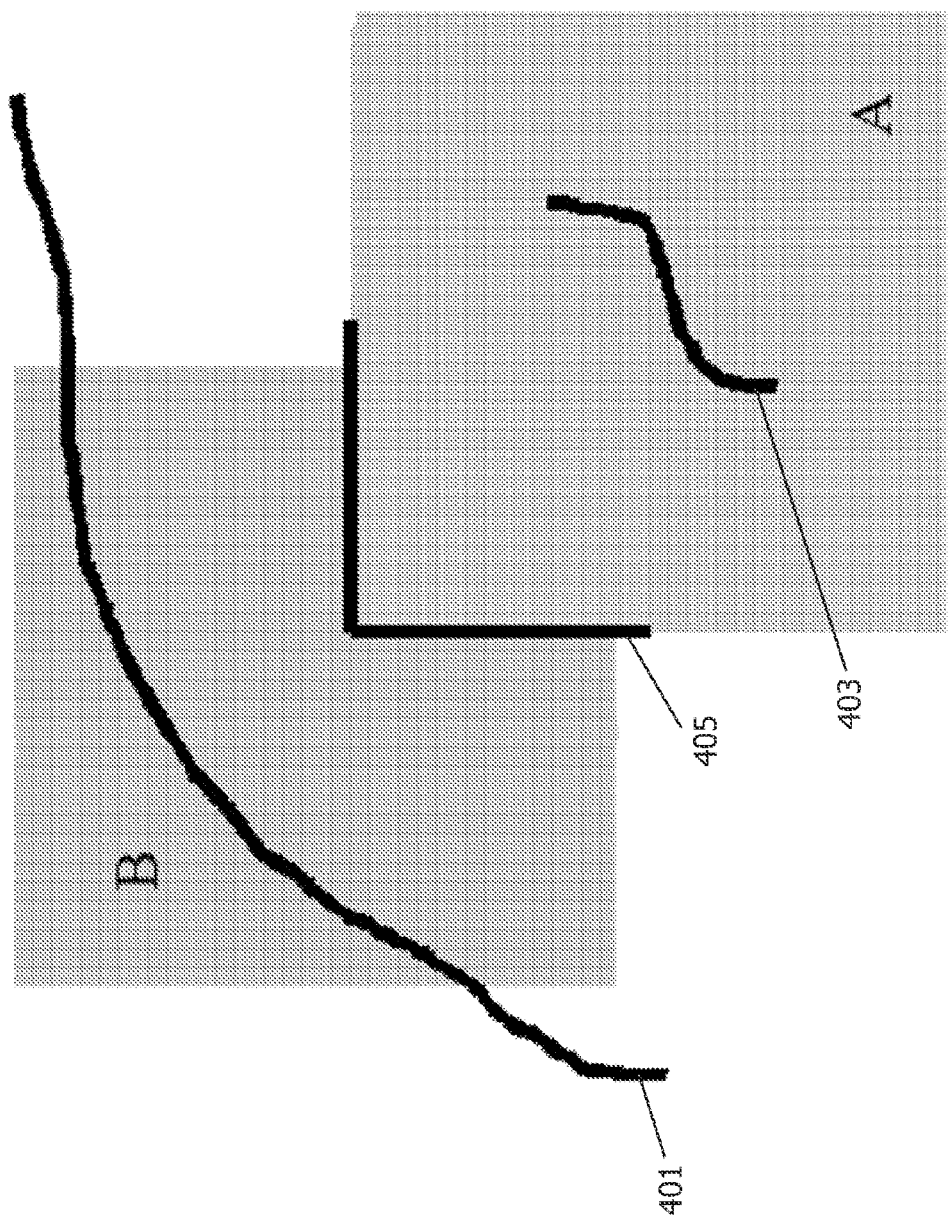
FIG. 4 illustrates an example of a section of an image comprising two image objects.

FIG. 4 indicates an example of a section of an image comprising two image objects A and B where A is a foreground object and B is a background object. In the example, the user has entered a background scribble 401, a foreground scribble 403 and a contour 405 defining the border between the segments corresponding to the two image objects.

The segmentation processor 309 proceeds to segment the image using the provided segment and boundary indications. In the system, the segmentation is simultaneously constrained by both the segment indications and the boundary indications. Thus, an automatic segmentation of the image is performed without any user input during the segmentation (but using the previously provided user input). The automatic segmentation is however constrained by the provided segment and boundary indications and basically is performed such that all pixels of a segment indication belong to the associated segment class and such that a boundary between segment classes exists where indicated by a boundary indication. The automatic segmentation by the segmentation processor 309 may specifically be based on visual characteristics of the images (e.g. based on colour variations).

In the example of FIG. 3, an iterative operation is implemented. Thus, the results of the automatic segmentation are presented by the segmentation processor 309 on the display (e.g. by overlaying the display image with lines indicating the segment edges). The user may then provide a further input of one or more segmentation and/or boundary indications, for example by the user selecting the desired operation and directly drawing on the touch sensitive display. Following the input of a new segment or boundary indication (or e.g. when the user specifically requests it), the segmentation is updated and the new segmentation may be presented on the display. Thus, from the segmentation result, the user can determine critical areas where the segmentation fails (e.g. where segmentation based only on segmentation indications fail due to the absence of a clear colour transition between objects). The user can then focus the manual user input on such critical areas and can specifically switch to contour mode to input a boundary indication thereby manually defining an edge between segments.

This iteration may be repeated until the operator is satisfied with the result and indicates that the segmentation operation for the image has finished. The iterative approach may provide improved interactive segmentation and may e.g. enable the user to limit the interaction to only the required number of inputs. The first displayed segmentation result may be the result of a fully automated segmentation without any consideration of any segment or boundary indications.

In the example of FIG. 3, the segmentation performed by the segmentation processor 309 is based on a propagation algorithm wherein a value indicative of which segment class the pixels are likely to belong to are disseminated in the picture by a propagation between neighboring pixels. The propagation may specifically originate from segment indications and spread/propagate from the pixels of the segment indications to neighboring pixels, and from these neighboring pixels to their neighboring pixels etc. In the example, the propagation is dependent on the visual characteristics of the pixels such that the propagation is strong between pixels having similar visual characteristics and weak between pixels having very different visual characteristics. Furthermore, in the approach, the propagation of the values are blocked (or attenuated) at the borders indicated by the boundary indications.

In more detail, the algorithm may be based on segment class link values that are indicative of a linking between a pixel region and a segment class. In the example, each pixel has a segment class link value for each possible segment class, i.e. in the specific example each pixel has a background segment class link value and a foreground segment class link value. Furthermore, in the example, the segment class link value is indicative of a probability that the pixel should be assigned to that segment class and accordingly each segment class link value belongs to the interval [0,1] where 0 is indicative of the pixel certainly not belonging to the segment class and 1 is indicative of the pixel certainly belonging to the segment class.

Initially, a segment class value for a given segment class is assigned to all pixels. The assignment is such that any pixel included in a (positive) segment indication for the segment class is given a predetermined value (indicating a high probability of the pixel belonging to the segment class. Typically a value of 1 is assigned). A second predetermined value is given to all other pixels where the second predetermined value is indicative of a lower probability of the pixel belonging to the segment class. For example, a value of 0 is assigned.

The segmentation processor 309 then proceeds to determine segment class values for pixels based on neighboring pixels and a visual similarity between the pixel and the neighboring pixels. This process is iterated a number of times (e.g. 50 or more) and is constrained by segment class link values for the pixels identified by the segment indications not being modified (i.e. they maintain the value of 1).

Thus, for pixels that are neighboring a segment indication for the given segment class, the first iteration results in the initial value of 0 being increased to a value that is dependent on the visual difference between the pixels. For similarly colored pixels the value may be changed to (close to) 1 thereby indicating that it is highly likely that these pixels belong to the same segment as the pixels indicated by the segmentation indication. In the subsequent iterations, the neighbors of the neighbour pixels have increased segment class link values and thus the segment class value propagate in the picture from the segment indications. Furthermore, the propagation is dependent on the visual similarity such that when a sharp transition is detected (e.g. a sharp colour transition), the propagation is blocked or substantially attenuated to reflect the high likelihood that the transition is indicative of a segment edge.

Furthermore, in addition to the dependency on the visual characteristics, the propagation is dependent on the boundary indications. Specifically, whenever a boundary indication indicates that a boundary exist between two neighbour pixels, the propagation of the segment class link value between these is significantly attenuated or is completely blocked. Thus, the propagation is such that any propagation across boundaries indicated by the boundary indications is substantially reduced or may specifically be blocked completely.

The combined simultaneous use of the boundary and segmentation indications allows for a much improved segmentation as it allows automatic segmentation to be controlled and biased towards the desired result by a low complexity and convenient user operation.

The segmentation processor 309 may in some embodiments apply the described algorithm to only a single segment class. For example, propagation may be performed only for the foreground segment class. Based on the propagation, each pixel may subsequently be assigned to one segment class based on the resulting segment class link value for the pixel. For example, all pixels having a segment class value of above 0.5 may be assigned a label corresponding to the foreground segment class and all other pixels may be assigned a label corresponding to the background segment class.

In the specific example of FIG. 3, the segmentation processor 309 proceeds to independently apply the propagation algorithm to each of the segment classes (i.e. to independently apply it to both the foreground and the background segment classes). Each individual pixel is then subsequently assigned to the segment class that has the highest segment class value.

In the following, a specific example of a segmentation operation of the system of FIG. 3 will be described with reference to FIG. 5 which illustrates an example of a method of interactive image segmentation in accordance with some embodiments of the invention.

In the system, the image is initially divided into a number of pixel regions, each of which may comprise one or more pixels. Thus, it will be appreciated that the references to pixels in the previously described examples would equally apply to pixel regions potentially comprising more than one pixel. The use of pixel regions with multiple pixels may specifically reduce complexity and computational burden for the described segmentation.

Figure 5:
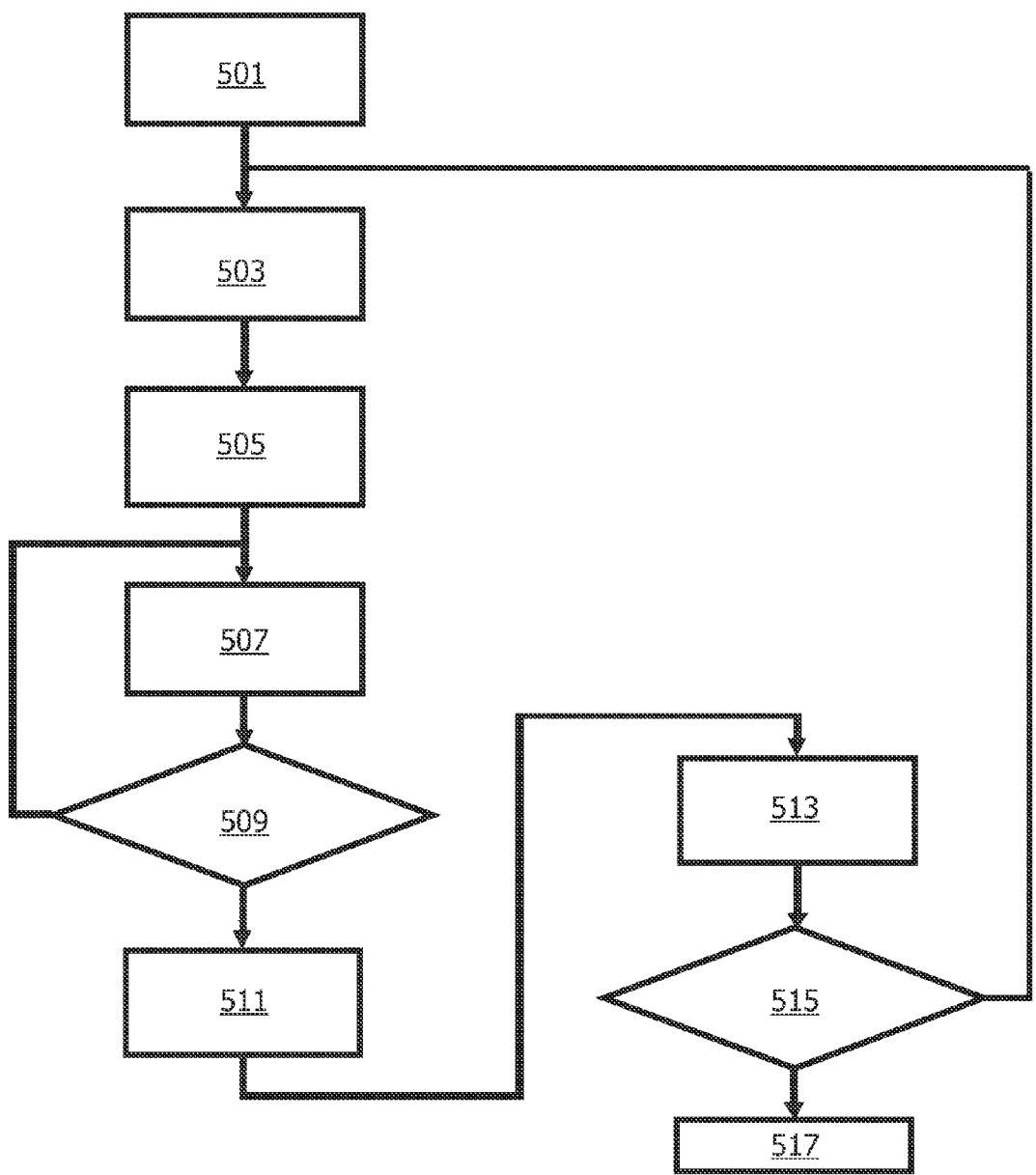
FIG. 5 illustrates an example of a method of interactive image segmentation in accordance with some embodiments of the invention.

Thus, the method of FIG. 5 initiates in step 501 by the segmentation processor 309 receiving the initial image and performing an over segmentation to generate a suitable number of pixel regions (i.e. the segmentation is into pixel regions which may each comprise one or more pixels but which are likely to be much smaller than the segments that will result from the interactive image segmentation). In the example, the system furthermore displays the received image on the display 303.

Specifically, the image is first over-segmented into many small regions. It will be appreciated that many different methods that can produce an over-segmentation are known and that any suitable such method may be used by the segmentation processor 309.

The initial over-segmentation may be based on any image or video property such as image colour, image texture or image motion.

Thus, the initial segmentation into pixel regions is performed without any user input and specifically without any consideration of any segment indications or boundary indications.

Optionally, the system of FIG. 3 may after the over segmentation to generate pixel regions proceed to segment the image to provide an initial segmentation proposal without any user input. The result of this segmentation may be plotted on top of the image as an overlay thereby allowing the user to e.g. skip any further interactive segmentation (if the result is already acceptable) or may highlight areas of particular difficulty for an automated segmentation.

Following step 501 an iterative and interactive segmentation based on user input is initialized. The segmentation uses a propagation approach wherein each pixel region is provided with a segment class link value for each possible segment class. The goal of the segmentation is to assign a segment label (corresponding to a segment class) to each pixel region. In the specific example, each pixel region is thus assigned to be either foreground or background. The segment class link value for a pixel region and segment class indicates the probability that the pixel region should be assigned to that segment class.

Step 501 is followed by step 503 wherein none, one or more segment indications are received from the user with each segment indication being linked to a segment class. As previously mentioned, the segment indications may be scribbles generated by the user directly drawing on the touch sensitive display 301, 303.

Step 503 is followed by step 505 wherein none, one or more boundary indications are received from the user. As previously mentioned, the segment indications may be contours generated by the user directly drawing on the touch sensitive display 301, 303.

It will be appreciated that in each iteration of the segmentation none, one or more segment indications and none, one or more boundary indications may be received but that typically at least one segment or boundary indication is received in each iteration.

Following step 505, the segmentation processor 309 initiates a propagation based segmentation wherein segment class link values assigned on the basis of the segment indications are propagated to pixel regions that are not identified by the corresponding segment indication(s). Furthermore, the propagation is dependent on the boundary indications as well as, in the example, the similarity of visual characteristics between the pixel regions. The propagation is performed separately for each individual segment class.

Thus, step 505 is followed by step 507 wherein a propagation of the segment class link values is performed for one segment class. Step 507 is followed by step 509 wherein it is determined whether all segment classes have been propagated. If so, the method continues in step 511 and otherwise it returns to step 507 to perform the propagation process for the next segment class. It will be appreciated that in some examples only a single segment class is used for the segment selection and thus that in some cases only a single iteration may be performed.

Figure 6:
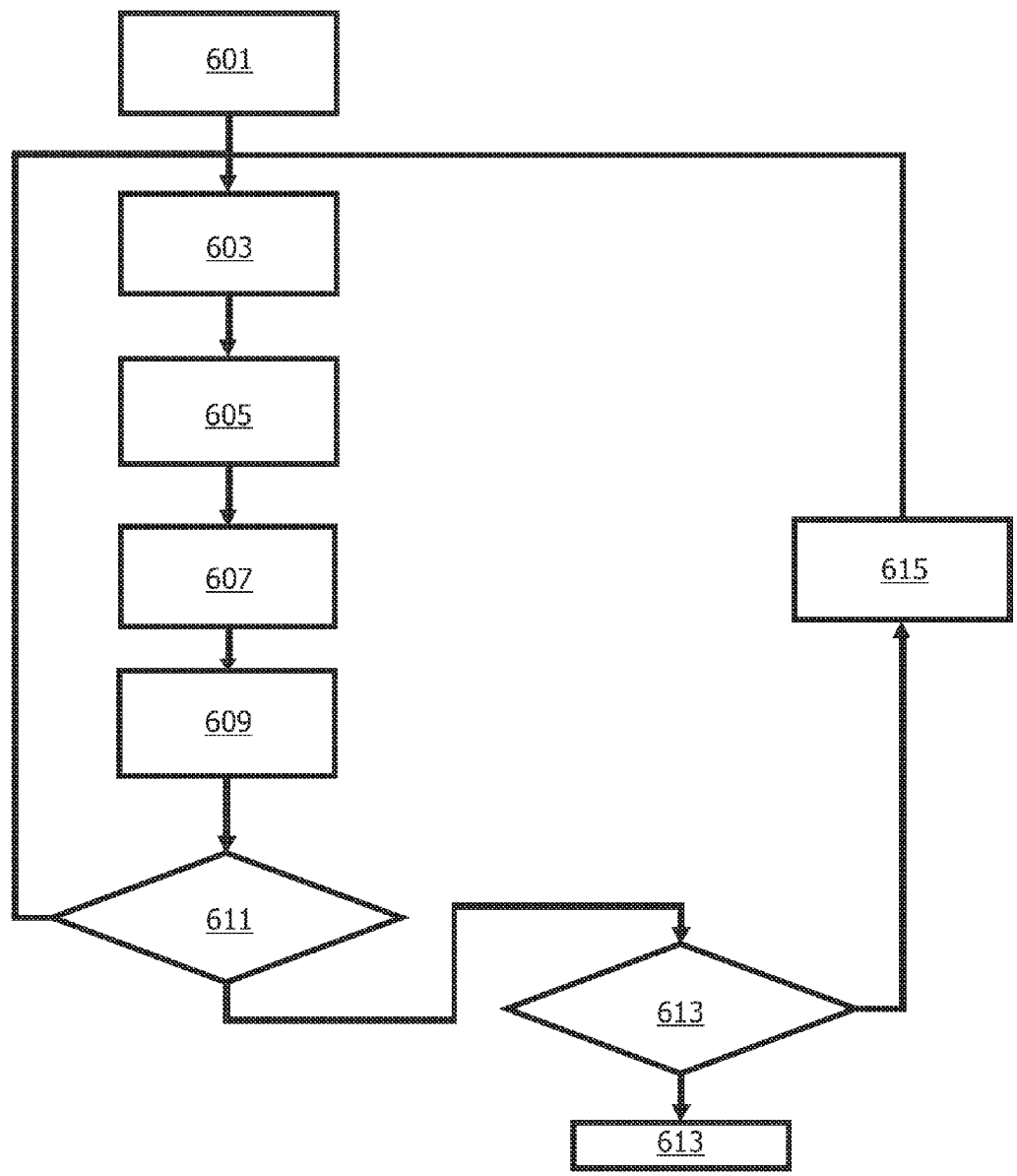
FIG. 6 illustrates an example of a method of propagating characteristics for an interactive image segmentation in accordance with some embodiments of the invention.

An example of the propagation approach will be described with reference to FIG. 6.

The propagation for a given segment class (e.g. for the background segment class or the foreground segment class) initiates in step 601 wherein a segment class link value for the segment class is assigned to the pixel regions that are identified by one or more segment indications provided by the user to belong to the segment class.

Specifically, the segment class link value for each pixel region identified by a segment indication for the segment class is assigned a predetermined value that is indicative of a strong link between the pixel region and the segment class, i.e. which indicates that it is likely that the pixel region belongs to this segment class.

Specifically, a scribble has the effect that all pixel regions that intersect with the scribble are given a segment class link value indicating a high confidence that the pixel regions belong to the corresponding segment class. E.g. if m denotes the segment class for a segment indication, all regions j∈i (where i is the set of all pixel regions) that are identified by the segment indication is given a value that unambiguously assigns the pixel regions to that segment class. E.g. a segment class link value indicating the probability that the pixel region belongs to the segment class is set to indicate a certainty that the pixel region belongs to the segment class:

$$p_j^{(m)} = 1$$

Similarly, for a negative segment indication (i.e. a segment indication that indicates pixel regions which do not belong to a specific segment class) a predefined value indicative of a weak (or no) link is assigned to the segment class link value. E.g. for a segment class link value indicating the probability that a pixel region, k, belongs to the segment class, the segment class link value is set to indicate a certainty that the pixel region does not belong to the segment class:

$$p_k^{(m)} = 0$$

It will be appreciated that a segment indication can simultaneously be a negative and positive segment indication. For example, in the example of segmenting into a foreground and background, a background scribble provides both a positive segment indication for the background segment class as well as a negative segment indication for the foreground segment class.

Thus, following step 601 a number of segment class link values have been assigned to some pixel regions. These pixel regions are referred to as the assigned set. Furthermore, a number of pixel regions have not been assigned any (fixed) segment class link values (because they are not part of a segment indication). These pixel regions are referred to as the unassigned set.

In some embodiments, an initial segment class link value may also be assigned to pixel regions of the unassigned set. E.g. an initial value that is indicative of a much weaker link to the segment class than the value used for positive segment indications may be assigned. Specifically, the initial segment class link values may be set to zero for all unassigned pixel regions (or may e.g. be set to 0.5 indicating that there is some prior belief that a specific segment class is present at the pixel region).

The method then proceeds to determine segment class link values for a group of pixel regions which specifically correspond to the unassigned set.

The propagation iteration starts in step 603 wherein the next pixel region in the unassigned set is selected. It will be appreciated that in different embodiments, different orders in which the pixel regions are updated may be used. For example, in some scenarios, the pixel regions may be processed from the top to the bottom and from left to right, in others the sequence may be from bottom to top and right to left, in others it may be in a sequence of growing distance to segment indications and in others it may e.g. be in a random order.

The method then continues in step 605 wherein a neighborhood set of pixel regions is determined for the current pixel region. In some embodiments, the neighborhood set may simply include all pixel regions that are adjacent to the current pixel but it will be appreciated that in other embodiments other sets may be used. For example, in some embodiments, the neighborhood set may be asymmetric and include a larger number of pixel regions in one direction than in another. For example, only pixel regions in the direction that have already been processed may be included. Furthermore, in some embodiments a specific pattern of selected pixel regions in the neighborhood of the current pixel region may be selected such as e.g. every alternate pixel region in a distance of up to, say, 3 pixel regions.

Thus, the neighborhood set may be selected in response to a relative position criterion which defines a number of pixel regions at positions relative to the current pixel region. The position criterion may for example specify distance and direction characteristics for the pixel regions to be included in the neighborhood set relative to the current pixel.

Step 605 is followed by step 607 wherein the neighborhood set is evaluated to determine whether any of the pixel regions thereof are separated from the current pixel region by a boundary indication. For example, if a vertical contour has been placed by the user to the immediate right of the current pixel region, all pixel regions of the neighborhood set will be separated from the current pixel region by the contour/boundary indication and accordingly these pixel regions will be designated as separated pixel regions.

Step 607 is followed by step 609 wherein the segment class link value for the current pixel region is calculated as a combination of the segment class link values of the neighborhood set of pixel regions. Furthermore, the combination is such that the combination is dependent on whether the neighborhood set comprises any separated regions. Specifically, the contribution from any separated pixel region is reduced relative to the corresponding contribution from that pixel region if it had not been separated by a boundary indication.

Specifically, the combination is such that the contribution from the segment class link value of each pixel region of the neighborhood set is weighted relative to the other pixel regions of the neighborhood set. The weighting is based on the visual similarity of the two pixel regions and specifically is based on the colour similarity. Thus allows a high weighting to be given to neighborhood pixel regions that are very similar in colour and thus are likely to belong to the same segment while a low weighting is given to neighborhood pixel regions that have very different colors thereby reflecting the reduced likelihood that these pixel regions belong to the same segment.

Furthermore, the weighting for a neighborhood pixel region is dependent on whether this is separated by a boundary indication and specifically the weighting of any separated pixel region is reduced relative to the situation where the pixel region is not separated by a boundary indication. The reduction may specifically correspond to a zero weighting where any contribution from the separated pixel region is ignored completely.

In the specific example, the segment class link value for pixel region i for segment class k is calculated from the segment class link values of the neighborhood pixel regions j. For region i, the segment class link value is updated using:

$$p_i^{(k)} = \frac{\sum_j w_{ij} p_j^{(k)}}{\sum_j w_{ij}}$$

with $$w_{ij} = \begin{cases} \exp(-\alpha(|r_i - r_j| + |g_i - g_j| + |b_i - b_j|)) & \text{if } j \text{ is not a separated region} \\ 0 & \text{otherwise} \end{cases}$$

where r, g and b indicate red, green and blue colour values for an RGB colour representation. The value α may be selected to provide the desired propagation characteristics (in many scenarios a typical value of around α=0.1 may be suitable). Thus, the weight for a neighborhood pixel region j, if the regions i and j have similar mean colour values and are not separated by a boundary indication, is high. However, segment class information is not propagated across boundary regions as the weight of such contributions is set to zero.

Thus, the segment class link value indicating the likelihood that the current pixel region belongs to the current segment class is determined from weighted contributions of neighborhood pixel regions.

It will be appreciated that in some embodiments the segment class link value for the current pixel may further include a contribution from a previous value of the segment class link value for the current pixel.

Step 609 is followed by step 611 wherein it is determined if all pixel regions of the unassigned set have been considered in the current iteration. If not, the method returns to step 603 to process the next pixel region.

If all pixel regions have been processed, the propagation may in some embodiments terminate. However, in the example, the propagation is achieved by iterating steps 603-611 and accordingly the method in this case continues in step 613 where it is evaluated if enough iterations have been performed. If not, the method initializes the next iteration in step 615 after which it returns to step 603 to perform the next iteration.

The initialization of the next iteration may specifically include selecting the order in which the pixel regions are processed. For example, improved propagation may often be achieved by using different sequences for the processing of the pixel regions in different iterations.

The iteration of the propagation step provides an improved propagation and typically the propagation will converge towards a stable assignment of segment class link values to the pixel regions which closely reflect the appropriate segmentation. For example, 10-100 iterations may often be suitable. It will be appreciated that in other embodiments, other stop conditions may be used.

When the propagation iterations have terminated, the method continues in step 509 wherein it is determined if the propagation should be iterated for other segment classes. Otherwise, the method continues in step 511 wherein a segment class is selected for each pixel region.

As a specific example, if propagation has only been performed for one segment class for a segmentation into two possible segment classes (e.g. a background and a foreground segment class), the segment class for a pixel region may be selected as the propagated segment class if the propagated segment class link value is above a threshold (e.g. 0.5) and may be selected as the complementary segment class otherwise.

In embodiments wherein segment class segment links are determined for a plurality of different segment classes (e.g. by iterating the described propagation for different segment classes), the selection of a segment class for a pixel region may be performed by comparing the segment class link values for the different segment class values to each other. Specifically, the segment class for which the segment class link value indicates the strongest link (e.g. the highest value) may be selected.

Thus following the selection of the segment classes, all pixel regions have been assigned a segment class (i.e. they have been labeled with a segment class to which they are considered to belong). Thus, the segmentation of the image has been completed and the resulting segmentation may be displayed on the display 303 in step 513.

The method then continues in step 515 wherein the user indicates whether the segmentation is acceptable or whether further updates should be performed. If so, the method returns to step 503 to receive further segment and/or boundary indications in response to which the propagation and segment class selection may be updated to provide a further improved segmentation. Otherwise the method terminates in step 517.

In the previously described examples, the segmentation was based on a propagation of segment class information from segment indications being constrained by the boundary indications. However, it will be appreciated that in other embodiments, other means of segmentation based on the information provided by the segmentation indications while constraining this to provide the boundaries indicated by the boundary indications may be used. For example, instead of the described propagation approach, the segmentation may use a graph cut algorithm based on the segmentation indications and constrained by the boundary indications. As another example, the process may be based on simulated annealing.

In the previous description, the boundary indications have been considered to lie between pixels, i.e. to not identify pixels but rather to separate pixels belonging to different pixel elements. However, it will be appreciated that in some embodiments, the boundary indications may be considered to have a width and may specifically identify one or more pixels (or even pixel regions) that are considered to be part of the boundary or edge of a segment.

For example, a user may enter a boundary indication by selecting some points on the image which are then connected by an automated curve generating algorithm. The pixels that lie on this curve (which may e.g. have a width of a pixel or more) are then designated as boundary pixels.

Furthermore, the boundary indication may be used to modify the over-segmentation and may specifically be used to modify the pixel regions. For example, a boundary indication may run through a pixel region thereby dividing the pixel region into two (or more) different areas. In this case, the pixel region may be split into three (or more) different (smaller) pixel regions corresponding to the two (or more) separated areas plus a pixel region comprising the boundary pixels.

The boundary pixel regions may be considered in the propagation and specifically the segment class link values for all boundary pixel regions may be set to zero during the propagation. Furthermore, all boundary pixel regions that meet the requirement to be included in a neighborhood set may simply be ignored in the combination. Following the segment class selection, the boundary regions may then be allocated a suitable segment class. For example, in some embodiments all boundary regions may be assigned a predetermined segment class (e.g. they are all assigned a foreground segment class) or may e.g. be assigned the segment class of the closest pixel region that is not a boundary region.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude

The invention claimed is:

1. A method of segmenting an image, the method comprising:
  receiving (503) a number of segment indications for the image, each segment indication identifying a set of pixel regions and a relationship between the set of pixel regions and an associated segment class of a plurality of segment classes;
  receiving (505) a number of boundary indications for the image, each boundary indication identifying a boundary between pixels belonging to different segment classes of the plurality of segment classes; and
  segmenting (507-511) the image into the plurality of segment classes in response to both the number of segment indications and the number of boundary indications.

2. The method of claim 1 wherein the segmenting comprises:
  assigning a segment class link value to each pixel region identified by at least a first segment indication, the segment class link value being indicative of a linking of the pixel region and the associated segment class of the first segment indication;
  propagating segment class link values to unassigned pixel regions in the image; and
  attenuating the propagation of segment class link values at a boundary indication.

3. The method of claim 1 wherein the propagation of the segment class values is further dependent on a similarity of visual properties for the pixel regions.

4. The method of claim 1 wherein the segmenting comprises:
  assigning (601) a first segment class link value for a first segment class of the plurality of segment classes to pixel regions identified by at least one segment indication associated with the first segment class, each segment class link value providing a link strength indication between the pixel region and the first segment class;
  determining (603-609) segment class link values for the first segment class for a group of pixel regions; and
  for at least some pixel regions of the group of pixel regions selecting (511) a segment class of the plurality of segment classes in response to the segment class link value for the first segment class for the pixel region;
  wherein determining (603-609) the segment class link values comprises:
  determining segment class link values for each pixel region of the group of pixel regions as a combination of segment class link values of a neighborhood set of pixel regions, the combination being dependent on any of the neighborhood set of pixel regions being separated from the each pixel region by a boundary indication.

5. The method of claim 4 wherein the assigning comprises further assigning an initial segment class link value to at least some pixel regions not assigned the first segment class link value, the initial segment class link value being indicative of a weaker link to the first segment class than the first segment class link value.

6. The method of claim 4 wherein the combination is such that a weighting of a segment class link value for a separated pixel region of the neighborhood set of pixel regions is reduced, the separated pixel region being a pixel region separated from the each pixel region by a boundary indication.

7. The method of claim 6 wherein the weighting of the separated pixel region is zero.

8. The method of claim 4 wherein the combination is such that a weighting of a segment class link value for a neighborhood pixel region of the neighborhood set of pixel regions is dependent on a similarity measure for a visual characteristic of the neighborhood pixel region and a visual characteristic of the each pixel region.

9. The method of claim 4 wherein the step of determining (603-609) segment class link values for each pixel region of the set of pixel regions is iterated prior to the step of for each pixel region of the group of pixel regions selecting the segment class.

10. The method of claim 4 further comprising the steps of:
  assigning a second segment class link value for a second segment class of the plurality of segment classes to pixel regions identified by at least one segment indication associated with the second segment class, each segment class link value providing a link strength indication between the pixel region and the second segment class;
  determining segment class link values for a group of pixel regions for the second segment class; and
  wherein the step of for each pixel region of the group of pixel regions selecting the segment class comprises selecting the segment class for a first pixel region in response to a comparison of a segment class link value for the first pixel region for the first segment class and a segment class link value for the first pixel region for the second segment class.

11. The method of claim 1 further comprising:
  presenting a segmentation of the image to a user;
  receiving a user input of at least one of a new segment indication and a new boundary indication for the image; and
  updating the segmentation in response to at least one of the new segment indication and the new boundary indication.

12. The method of claim 1 further comprising generating (501) pixel regions by an initial segmentation not being based on any boundary indications or segment indications.

13. The method of claim 1 wherein the segmentation is a depth map segmentation.

14. A non-transitory computer readable medium storing a program for executing the method of claim 1.

15. A device for segmenting an image, the apparatus comprising:
  means (301, 305) for receiving a number of segment indications for the image, each segment indication identifying a set of pixel regions and a relationship between the set of pixel regions and an associated segment class of a plurality of segment classes;
  means (301, 307) for receiving a number of boundary indications for the image, each boundary indication identifying a boundary between pixels belonging to different segment classes of the plurality of segment classes; and
  means (309) for segmenting the image into the plurality of segment classes in response to both the number of segment indications and the number of boundary indications.

* * * * *